(12) United States Patent
Åström et al.

(10) Patent No.: US 11,419,071 B2
(45) Date of Patent: Aug. 16, 2022

(54) METHOD AND APPARATUS FOR SYNCHRONIZATION SIGNAL TRANSMISSION

(71) Applicant: Telefonaktiebolaget LM Ericsson (publ), Stockholm (SE)

(72) Inventors: Magnus Åström, Lund (SE); Fredrik Nordström, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 60 days.

(21) Appl. No.: 16/756,503

(22) PCT Filed: Oct. 17, 2017

(86) PCT No.: PCT/EP2017/076451
§ 371 (c)(1),
(2) Date: Apr. 16, 2020

(87) PCT Pub. No.: WO2019/076441
PCT Pub. Date: Apr. 25, 2019

(65) Prior Publication Data
US 2020/0288418 A1    Sep. 10, 2020

(51) Int. Cl.
*H04W 56/00* (2009.01)
*H04B 7/06* (2006.01)
*H04W 16/28* (2009.01)

(52) U.S. Cl.
CPC ........ *H04W 56/001* (2013.01); *H04B 7/0617* (2013.01); *H04W 16/28* (2013.01)

(58) Field of Classification Search
CPC ... H04W 56/001; H04W 16/28; H04B 7/0617
See application file for complete search history.

(56) References Cited

U.S. PATENT DOCUMENTS

| 2017/0078001 | A1* | 3/2017 | Kim ............... H04B 7/0469 |
| 2017/0251441 | A1 | 8/2017 | Axnäs et al. |
| 2017/0353234 | A1* | 12/2017 | Islam ............ H04L 27/2692 |
| 2019/0132880 | A1* | 5/2019 | Byun ............. H04B 7/0695 |
| 2019/0281563 | A1* | 9/2019 | Lee ............... H04L 27/2692 |

FOREIGN PATENT DOCUMENTS

WO    2017171867 A1    10/2017

\* cited by examiner

*Primary Examiner* — Brenda H Pham
(74) *Attorney, Agent, or Firm* — Murphy, Bilak & Homiller, PLLC

(57) ABSTRACT

Adopting a frequency multiplication scheme allows a network node to expand the number of transmit beams transmitted by it within a defined time interval, and allows the network node to transmit a greater number of synchronization signals on a per beam basis within the defined time interval. By way of example, the network node may operate in compliance with standardized restrictions regarding the timeframe during which it must transmit some base number of beam-based synchronization signals, while using a frequency multiplexing scheme to transmit additional beams within the same timeframe. Among the various advantages flowing from these operations, the ability to transmit more beams within the same timeframe allows the network node to tailor the beam shape and directions for broader coverage or enhanced range.

12 Claims, 4 Drawing Sheets

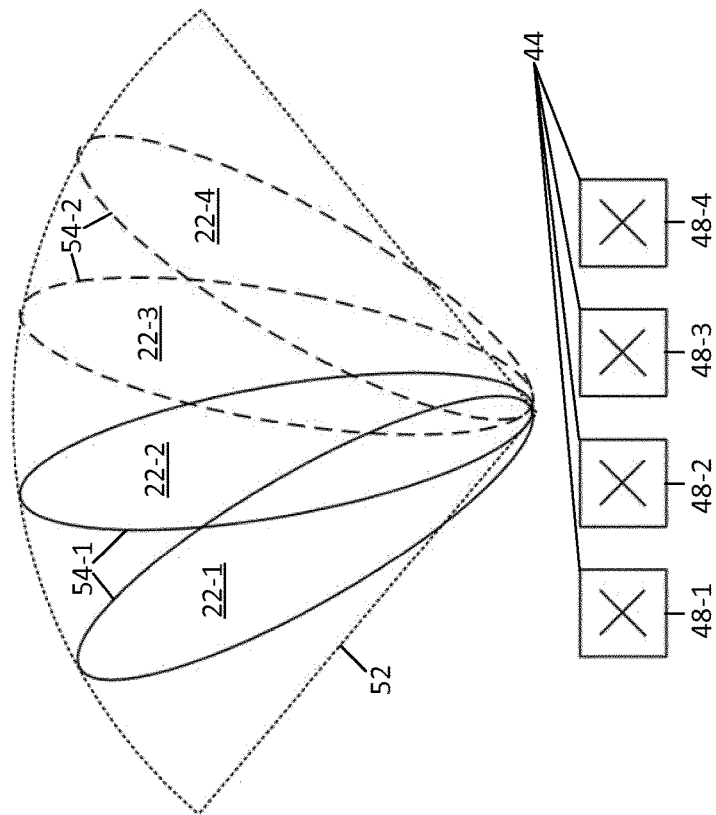
FIG. 4
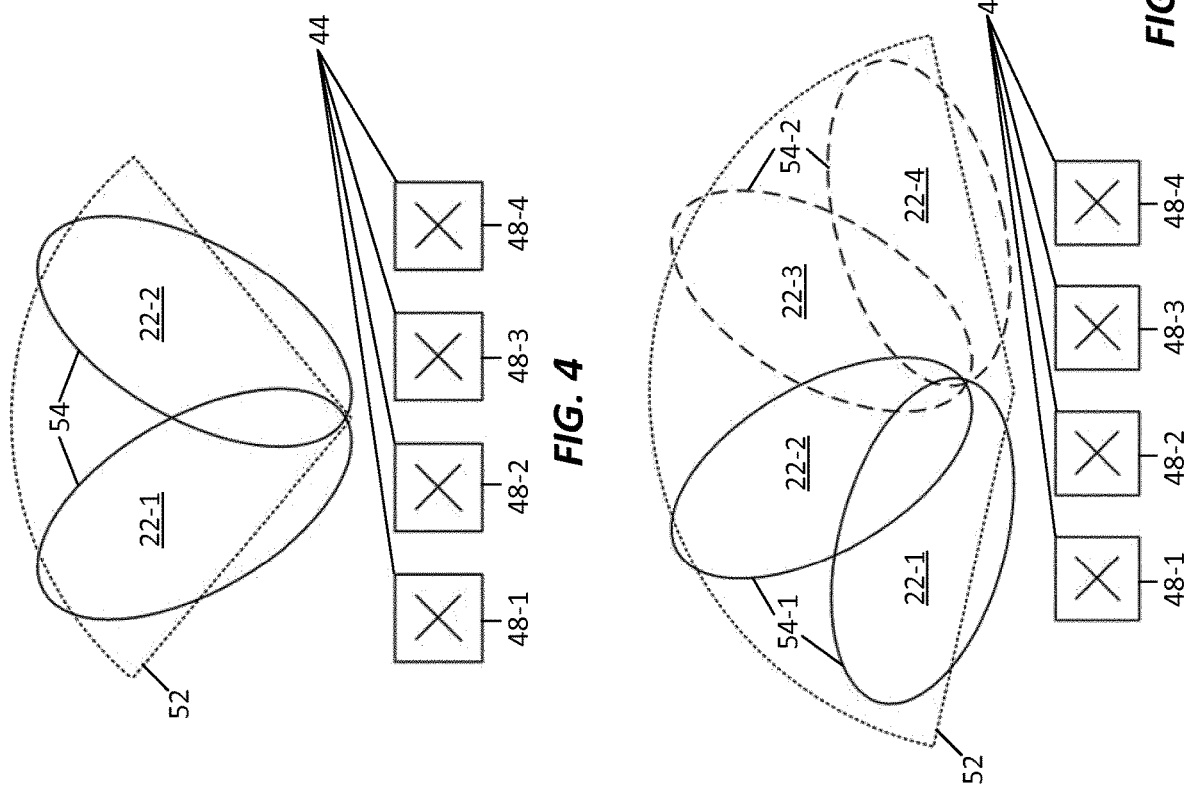
FIG. 5
FIG. 6

METHOD AND APPARATUS FOR SYNCHRONIZATION SIGNAL TRANSMISSION

TECHNICAL FIELD

The present invention relates to wireless communication networks that use beamforming and the transmission of synchronization signals therein.

BACKGROUND

One of the novelties of New Radio, NR, compared to legacy systems such as LTE is the increased frequency range of operation and the directly associated need for more beamforming to achieve sufficient performance in range and throughput. Achieving sufficient beamforming may require advanced antenna systems with several hundred antenna elements with higher operating frequencies generally requiring more antenna elements. For example, thirty-two antenna elements may be realistic for a 3 GHz system. With dual polarization, the thirty-two antenna elements provide sixteen dual polarized antenna pairs.

However, ongoing 5G standardization work in the Third Generation Partnership Project, 3GPP, contemplates restricting the maximum number of beams per frequency range. For example, the NR standards under development restrict the number of synchronization signal beams to one, two, or four beams when the frequency of operation is 3 GHz or less. The same standards specify the use of four or eight synchronization signal beams for operating frequencies between 3 and 6 GHz, and sixty-four beams for operating frequencies greater than 6 GHz. Further restrictions imposed in the standard dictate the time interval for performing synchronization signal transmissions.

SUMMARY

Adopting a frequency multiplication scheme allows a network node to expand the number of transmit beams transmitted by it within a defined time interval, and allows the network node to transmit a greater number of synchronization signals on a per beam basis within the defined time interval. By way of example, the network node may operate in compliance with standardized restrictions regarding the timeframe during which it must transmit some base number of beam-based synchronization signals, while using a frequency multiplexing scheme to transmit additional beams within the same timeframe. Among the various advantages flowing from these operations, the ability to transmit more beams within the same timeframe allows the network node to tailor the beam shape and directions for broader coverage or enhanced range.

In one embodiment, a method of operation at a network node in a wireless communication network includes transmitting synchronization information in a plurality of beam directions within a defined time interval, according to a frequency division multiplexing scheme. The frequency division multiplexing scheme comprises, for each transmission of synchronization information in a directional beam at a first transmission frequency, simultaneously performing one or more further transmissions of synchronization information in one or more further directional beams at respective further transmission frequencies.

In another embodiment, a network node configured for operation in a wireless communication network includes communication circuitry and processing circuitry. The communication circuitry is configured to interface the network node to a directional antenna, or to interface the network node to a further network node configured for transmitting from the directional antenna. Correspondingly, the processing circuitry is configured to, via the communication circuitry, control the transmission of synchronization information from the directional antenna in a plurality of beam directions within a defined time interval. The processing circuitry exercises its control according to a frequency division multiplexing scheme that includes, for each transmission of synchronization information in a directional beam at a first transmission frequency, the simultaneous transmission of synchronization information in one or more further directional beams at respective further transmission frequencies. The network node may perform these transmissions directly, or cause a further node to perform them.

In another example embodiment, a network node is configured for operation in a wireless communication network and includes a communication module and a processing module. The communication module interfaces the processing module to a directional antenna, or interfaces the processing module to a further network node that includes the directional antenna. The processing module is configured to, via the communication module, control the transmission of synchronization information from the directional antenna in a plurality of beam directions within a defined time interval, according to a frequency division multiplexing scheme. The frequency division multiplexing scheme includes, for each transmission of synchronization information in a directional beam at a first transmission frequency, the simultaneous transmission of synchronization information in one or more further directional beams at respective further transmission frequencies.

In yet another example embodiment, a computer-readable medium stores a computer program comprising program instructions that, when executed by processing circuitry in a network node configured for operation in a wireless communication network, configures the network node to control the transmission of synchronization information from a directional antenna in a plurality of beam directions within a defined time interval, according to a frequency division multiplexing scheme. The frequency division multiplexing scheme includes, for each transmission of synchronization information in a directional beam at a first transmission frequency, the simultaneous transmission of synchronization information in one or more further directional beams at respective further transmission frequencies.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 4 through 6 are diagrams of example beam configurations, with FIGS. 4 and 5 illustrating example approaches for increasing the number of transmitted synchronization beams in comparison to a base number of beams as seen in FIG. 4.

DETAILED DESCRIPTION

Figure 1:
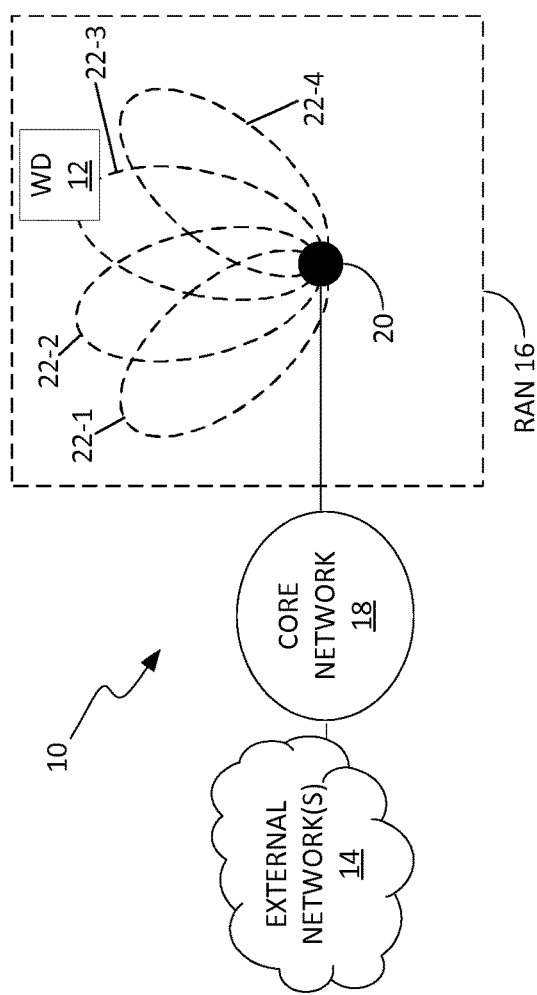
FIG. 1 is a block diagram of a wireless communication network according to one embodiment.

FIG. 1 illustrates an example wireless communication network 10 that provides communication services to wireless devices, such as by communicatively coupling them to one or more external networks 14. For simplicity, the diagram illustrates a single wireless device, denoted as "WD" 12, but in operation the network 10 may support many WDs 12. One or more telecommunication standards may govern the organization and operation of the network 10. For example, the network 10 operates in accordance with standards promulgated by the Third Generation Partnership Project, 3GPP. In at least one such embodiment, the network 10 operates according to the New Radio, NR, standards being developed by the 3GGP for deployment in Fifth Generation, 5G, communication networks.

The WD 12 represents a wireless communication apparatus and is not limited to any particular type of apparatus, or to any particular functionality. For example, the WD 12 comprises a User Equipment, UE, in the parlance of the 3GPP and is configured as a mobile communication terminal or is configured as a Machine Type Communication (MTC) terminal. The WD 12 in another example comprises an Internet of Things (IoT) device. Other examples run the gamut from wirelessly connected laptop computers to network adapters, or essentially any other type of wireless communication apparatus configured for operation within the network 10. In practice, there may be any different types of WDs 12 operating in the network 10.

Although the network 10 may comprise a complex array that includes multiple nodes of different types and functionality, FIG. 1 offers a simplified view that includes a Radio Access Network, RAN, 16 that is coupled to a Core Network, CN, 18. The RAN 16 provides the wireless interface—air interface—that communicatively couples the WD 12 to the network 10 while the CN 18 interfaces with the one or more external networks 14, such as the Internet.

Figure 3:
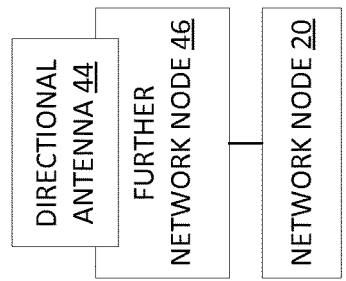
FIG. 3 is a block diagram of a network node configured for communication with a further network node having a directional antenna, according to one embodiment.
Figure 2:
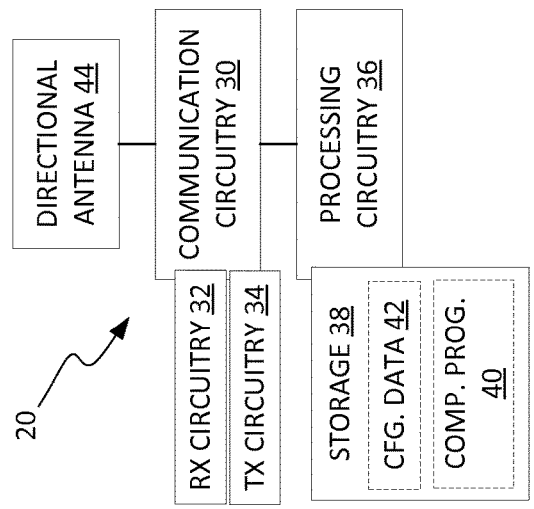
FIG. 2 is a block diagram of a network node having a directional antenna, according to one embodiment.

The RAN 16 includes a network node 20 that, in the example context of FIG. 1, transmits signals in respective transmit beams 22-1, 22-2, 22-3, and 22-4. The number of beams 22 and their overlapping relation represent nonlimiting examples. However, the network node 20 is not necessarily a radio node, and, in some embodiments, it exercises control over a further node that performs the radio transmissions in question. FIGS. 2 and 3 offer nonlimiting example embodiments corresponding to these 2 possibilities.

According to the embodiment depicted in FIG. 2, the network node 20 comprises as a radio network node having communication circuitry 30 that includes receiver circuitry 32 and transmitter circuitry 34. The receiver circuitry 32 and the transmitter circuitry 34 comprise, for example, cellular radio circuitry for signal reception and transmission and associated processing according to the applicable air interface protocols.

Further elements in the network node 20 include processing circuitry 36 that is operatively associated with the communication circuitry 30, e.g., the processing circuitry 36 sends and receives control and/or data via the communication circuitry 30. In at least one embodiment, the processing circuitry 36 includes or is associated with storage 38. The storage 38 comprises, for example, one or more types of computer-readable media. Examples include solid-state disk storage and/or one or more types of memory, such as any one or more FLASH, DRAM, and SRAM.

The processing circuitry 36 comprises fixed circuitry, e.g. dedicated hardware circuitry, or programmable circuitry, or some combination of dedicated and programmable circuitry. In at least one embodiment, the processing circuitry 36 includes one or more microprocessor-based circuits that are configured to carry out at least some of the processing detailed herein based on their execution of stored computer program instructions. To that end, in at least one embodiment, the storage 38 stores one or more computer programs 40 containing the relevant computer program instructions. The storage 38 may also store one or more items of relevant configuration data 42.

The communication circuitry 30 interfaces with a directional antenna 44 used by the network node 20 for carrying out beamforming operations contemplated herein. However, as noted, the network node 20 may not operate as a radio network node and, instead, may control a further node that performs the beamforming in question. Thus, in addition to the receiver circuitry 32 and the transmitter circuitry 34, or as an alternative to such radio circuitry, the communication circuitry 30 includes one or more inter-node communication interfaces comprising physical layer circuitry and associated protocol processing circuitry configured for communicating with one or more further nodes in the network 10.

For example, in the embodiment depicted in FIG. 3, the network node 20 does not operate as a radio network node or at least does not include the directional antenna 44. Instead, the network node 20 communicatively couples to a further network node 46 that in turn performs beamforming transmissions from a directional antenna 44. Nonetheless, the network node 20 controls, e.g. configures, beamforming operations at the further network node 46 via control signaling exchanged between the network node 20 and the further network node 46.

FIG. 4 illustrates an example arrangement for the directional antenna 44, which comprises a plurality of antenna elements 48. While there may be many antenna elements 48, FIG. 4 provides for a simplified discussion by illustrating four antenna elements 48, shown as 48-1, 48-2, 48-3, and 48-4. FIG. 4 may be understood as illustrating a baseline reference with respect to FIGS. 5 and 6, which involve the use of frequency-division multiplexing to transmit an expanded number of directional beams 22 in comparison to a base number of directional beams 22. Along those lines, FIG. 4 illustrates the transmission of two beams 22, depicted as beams 22-1 and 22-2. The two beams 22 provide radio coverage over a corresponding geographic area 52 and may be understood as comprising one set 54 of beams 22.

Now consider FIG. 5. In FIG. 5, the directional antenna 44 transmits twice the number of beams 22 as transmitted by the directional antenna 44 in FIG. 4, for the same defined time interval. By way of example, the size and shape of beams 22 used in the configuration of FIG. 5 are the same or substantially like the size and shape of beams 22 used in the configuration of FIG. 4. Consequently, the increased number of beams 22 allows for the transmission of directional signals over a larger coverage area 52.

The network node 20 accomplishes the beam-number expansion according to a frequency division multiplexing scheme that, in an example embodiment, includes transmitting a first set 54-1 of beams 22-1 and 22-2 using a first frequency and transmitting a second set 54-2 of beams 22-3 and 22-4 using a second frequency. The first and second frequencies reside in a system bandwidth used for transmitting from the directional antenna 44, for example.

The beams 22 within the second set 54-2 are drawn in dashed lines to denote the use of a different frequency for their transmission as compared to the frequency used for transmitting the beams 22 in the first set 54-1. While FIG. 6 also depicts the use of frequency division multiplexing to expand the number of beams 22 that are transmitted within a defined time interval, the figure also illustrates the use of narrower or more focused beams 22 to achieve a greater range of transmission, albeit at the expense of a less broad coverage area 52.

In an example case, the applicable operating standards dictate that a certain number of transmit beams 22 with included synchronization signals are to be transmitted within a defined time interval. Because of transmit power limitations and other considerations, the beams 22 are transmitted one at a time in a sweeping fashion, or according to some defined pattern, which means that the different beams 22 are transmitted at different times within the defined time interval. One or more embodiments contemplated herein advantageously build on that base arrangement by transmitting additional beams 22 on one or more additional frequencies.

For example, for every beam 22 transmitted in a base set 54-1 of beams 22, the control node 20 may transmit or cause to be transmitted one or more additional beams 22, with each additional beam 22 being transmitted at a different frequency. Each additional beam 22 belongs to a respective additional set 54 of beams 22. That is, a further set 54 of beams 22 gets transmitted on each additional frequency in use.

Figure 7:
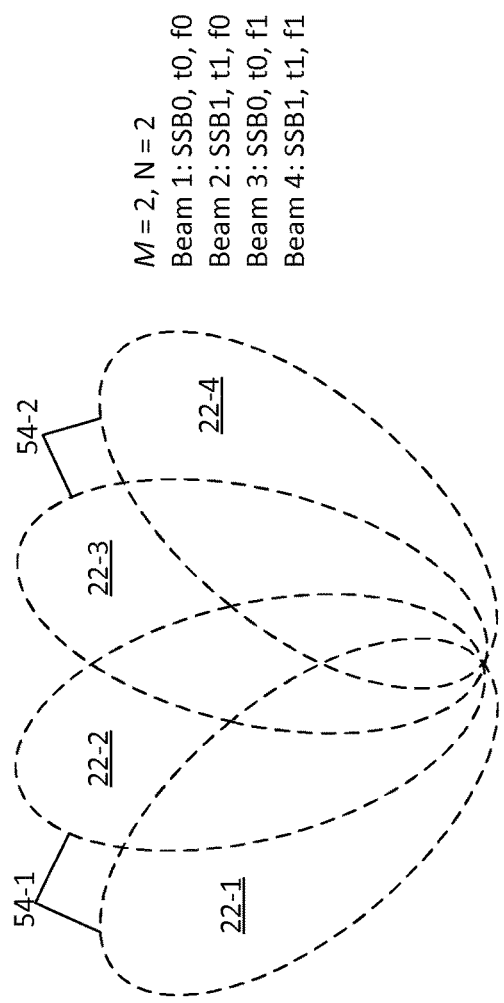
FIG. 7 is a diagram of an example embodiment of a frequency multiplexing scheme for transmitting an expanded number of synchronization signals in respective beams, within a defined time interval.

FIG. 7 illustrates an example mapping of synchronization signal blocks, SSBs, to respective beams 22 in first and second sets 54-1 and 54-2 of beams 22. The first set 54-1 of beams 22 includes beams 22-1 and 22-2, and the second set 54-2 of beams 22 includes beams 22-3 and 22-4. The first set 54-1 of beams 22 is associated with a first transmit frequency, denoted as f0 in the diagram, and the second set 54-2 of beams 22 is associated with a second transmit frequency, denoted as f1 in the diagram. Further, the involved set of SSBs includes SSB0 and SSB1.

At time t0, the SSB0 is transmitted on the beam 22-1 using the transmit frequency f0 and, at the same time t0, the same SSB0 is transmitted on the beam 22-3 using the transmit frequency f1. At time t1, the SSB1 is transmitted on the beam 22-2 using the transmit frequency f0 and, at the same time t1, the same SSB1 is transmitted on the beam 22-4 using the transmit frequency f1. In this example, the times t0 and t1 shall be understood as separate transmission times, e.g., different sub frames, within a defined time interval. Such operations may recur on a periodic basis, such as one or more times within each transmission frame in a succession of transmission frames. Further, while FIG. 7 contemplates transmitting one beam per frequency for each transmission time within the defined time interval, other arrangements are contemplated.

In an example relevant to the above details, an SSB is composed of a Primary Synchronization Signal, PSS, a Secondary Synchronization Signal, SSS, and a Physical Broadcast Channel, PBCH. According to this composition, the SSB provides synchronization information as well as a Master Information Block, MIB, containing fundamental cell and network information. As a more general example, an SSB comprises a set of signals or signal components that are independent from other signals and enable the receiving entity to obtain time and frequency synchronization with the network, or at least with the node transmitting the SSB.

Figure 8:
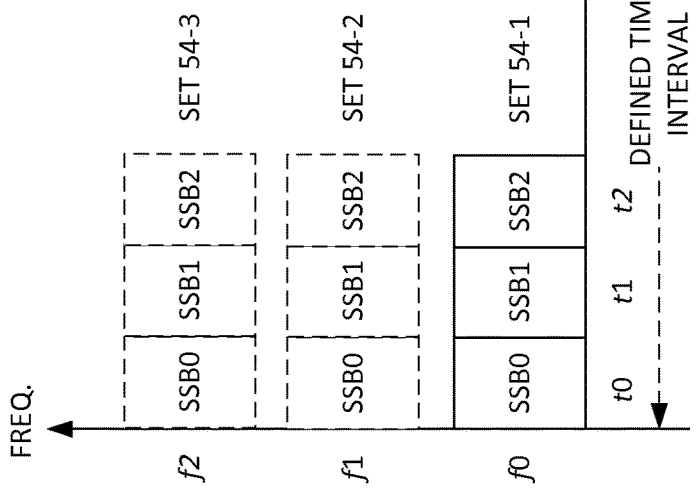
FIG. 8 is a diagram of another example embodiment of a frequency multiplexing scheme for transmitting an expanded number of synchronization signals in respective beams, within a defined time interval.

FIG. 8 extends the example of FIG. 7 by considering the frequency-multiplexed transmission of three sets 54-1, 54-2, and 54-3 of beams 22. FIG. 8 also offers an alternative view by depicting 3 respective transmission times t0, t1, and t2 spaced apart along a timeline within a defined time interval. At the time t0, one beam 22 from each set 54 is used to transmit the SSB0, with each such beam 22 being transmitted on a respective one of the frequencies f0, f1, and f2. At the time t1, a next beam 22 from each set 54 is used to transmit the SSB1, with each such beam 22 being transmitted on a respective one of the frequencies f0, f1, and f2. At the time t2, a next beam 22 from each set 54 is used to transmit the SSB2, with each such beam 22 being transmitted on a respective one of the frequencies f0, f1, and f2.

Figure 9:
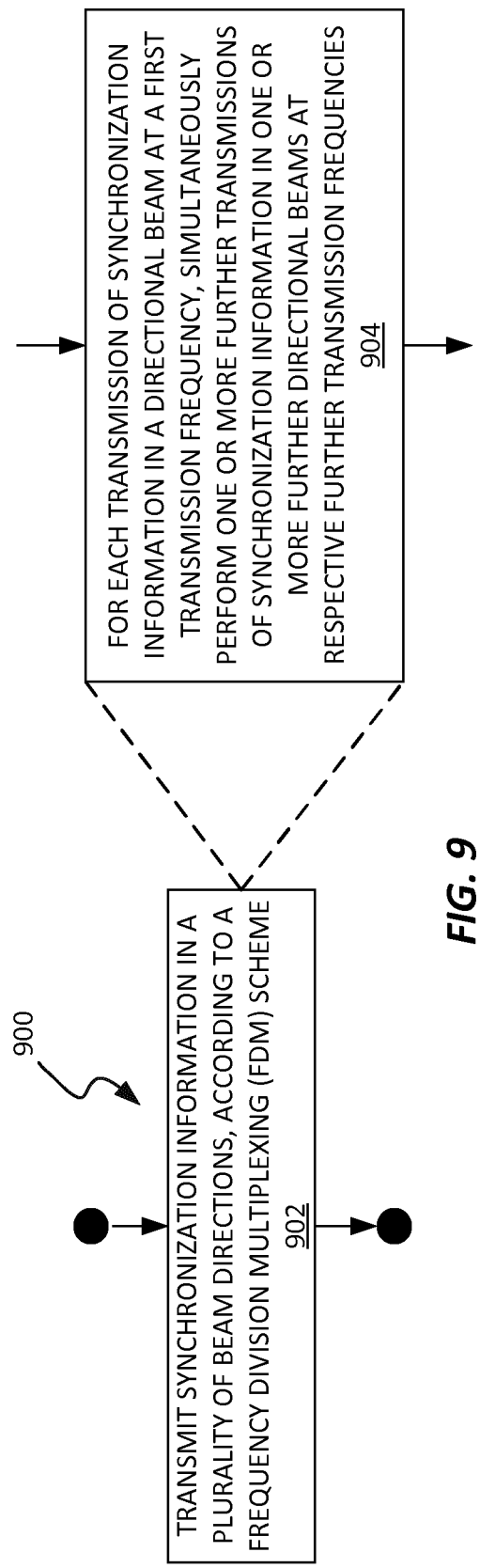
FIG. 9 is a logic flow diagram of one embodiment of a method for transmitting synchronization information via respective transmit beams.

FIG. 9 illustrates an example method 900 of operation for a network node 20 that is in keeping with one or more of the embodiments described above. The method 900 includes transmitting synchronization information in a plurality of beam directions, according to a frequency division multiplexing, FDM, scheme (Block 902). The SSB transmissions described above represent one example of the kind of synchronization information that may be transmitted according to the method 900. Further, in carrying out the operations associated with Block 902, the method 900 includes (Block 904), for each transmission of synchronization information in a directional beam 22 at a first transmission frequency, simultaneously performing one or more further transmissions of synchronization information in one or more further directional beams 22 at respective further transmission frequencies.

According to at least one embodiment, the frequency division multiplexing scheme comprises transmitting synchronization information in a first set 54-1 of directional beams 22 transmitted at the first transmission frequency, and transmitting synchronization information in at least one further set 54-2 of directional beams 22. Each further set 54-1 of beams 22 is transmitted at a respective further transmission frequency.

In a more detailed example, the plurality of beam directions comprises R beam directions, wherein R is the product of two integers N and M. The integer M represents a specified base number of directional beams 22 that must be transmitted within a defined time interval, and N represents a desired multiple of M. For example, a controlling 3GPP specification or other standards document defines the base number of directional beams 22 and defines the timing for the transmission of that base number of beams 22 within a specified time interval. Correspondingly, the integer number N represents a desired expansion of the base number, such as to provide for broader coverage for extended range using a correspondingly expanded number of beams 22.

In one or more embodiments, the integer M is a power of two, and wherein the integer N is two or greater. More broadly, in at least one embodiment, there are N sets 54 of directional beams 22 transmitted by the network node 20 within the defined time interval, including the first set and N−1 further sets, with each set 54 being transmitted at a different transmission frequency and with each set 54 including M directional beams 22. Here, the frequency division multiplexing scheme includes, at each of M transmission times within the defined time interval, simultaneously transmitting N directional beams, the N directional beams comprised of one directional beam 22 per set 54. FIG. 8 illustrates an example implementation of these details. Also in this context, any reference to the network node 20 "transmitting" directional beams 22 shall be understood as referring to direct transmission by the network node 20 or the network node 20 causing a further network node 46 to carry out such transmissions.

The method 900 further includes, in at least one embodiment, differentiating the synchronization information transmitted in each directional beam 22, at least within each set 54 of directional beams 22. In general, a receiving WD 12 can provide the network 10 with a differentiating indication regarding the particular beam 22 in which the WD 12 received synchronization information. The indication can be implicit or explicit, and may reflect any one or more of contents or an identity associated with the synchronization information received by the WD 12, a direction of reception of the beam 22, and a relative or absolute timing associated with reception of the beam 22. In at least one case, the method 900 further comprises including a different identity in the synchronization information transmitted for each set 54 of directional beams 22.

In related details, and one or more embodiments, the method 900 further comprises receiving signaling from a WD 12 corresponding to synchronization information received by the WD 12 in a corresponding one of the directional beams 22. In such embodiments, the method 900 further includes identifying the corresponding directional beam 22 based on the return signaling indicating or otherwise depending on the frequency of the corresponding directional beam 22 and further indicating or depending on an identity or synchronization signal sequence included in the synchronization information.

The plurality of beam directions corresponds to an overall set of directional beams 22 having respective beam coverage areas, the overall set of directional beams 22 being divided into two or more sets 54. Each set 54 is associated with a different transmission frequency. The frequency division multiplexing scheme includes transmitting synchronization information at successive transmission times within the defined time interval, including, at each transmission time, transmitting synchronization information in one directional beam 22 from each set 54.

With the above operations in mind, an example network node 20 is configured for operation in a network 10 and includes communication circuitry 30 that interfaces the network node 20 to a directional antenna 44, or that interfaces the network node 20 to a further network node 46 that is configured for transmitting from a directional antenna 44. The network node 20 further includes processing circuitry 36 that is configured to, via the communication circuitry 30, control the transmission of synchronization information from the directional antenna 44 in a plurality of beam directions within a defined time interval. The processing circuitry 36 controls the transmissions according to a frequency division multiplexing scheme. The frequency division multiplexing scheme includes, for each transmission of synchronization information in a directional beam 22 at a first transmission frequency, the simultaneous transmission of synchronization information in one or more further directional beams 22 at respective further transmission frequencies.

According to the frequency division multiplexing scheme in at least one embodiment, the processing circuitry 36 is configured to transmit synchronization information in a first set 54 of directional beams 22 transmitted at the first transmission frequency, and transmit synchronization information in at least one further set 54-2 of directional beams 22. Each further set 54 being transmitted at a respective further transmission frequency.

The plurality of beam directions comprises, for example, R beam directions. Here, R is the product of two integers N and M, where M represents a specified base number of directional beams 22 that must be transmitted within the defined time interval, and N represents a desired multiple of M. The integer M is a power of two and the integer N is two or greater, in at least some embodiments.

In at least some embodiments, the processing circuitry 36 is configured to differentiate the synchronization information transmitted in each directional beam 22, at least within each set 54 of directional beams 22. Further, in at least one embodiment, the processing circuitry 36 is configured to include a different identity in the synchronization information transmitted for each set 54 of directional beams 22.

In at least one embodiment, there are N sets 54 of directional beams 22 transmitted by the network node 20 within a defined time interval, including a first set 54 and (N−1) further sets 54. Each set 54 is transmitted at a different transmission frequency and each set includes M directional beams 22. According to the frequency division multiplexing scheme, the processing circuitry 36 is configured to, at each of M transmission times within the defined time interval, simultaneously transmit N directional beams 22, the N directional beams 22 comprised of one directional beam 22 per set 54.

In at least one embodiment, the processing circuitry 36 is configured to receive signaling from a WD 12 directly, or indirectly through a further network node 46. The received signaling corresponds to synchronization information received by the wireless device (12) in a corresponding one of the directional beams 22, and identifies the corresponding directional beam 22 based on the return signaling indicating or otherwise depending on the frequency of the corresponding directional beam 22 and further indicating or depending on an identity or synchronization signal sequence included in the synchronization information.

The plurality of beam directions corresponds to an overall set of directional beams 22 having respective beam coverage areas. The overall set of directional beams 22 is divided into two or more sets 54, each set 54 being associated with a different transmission frequency, and where, according to the frequency division multiplexing scheme, the processing circuitry 36 is configured to transmit synchronization information at successive transmission times within the defined time interval. Such operations include, at each transmission time, transmitting synchronization information in one directional beam 22 from each set 54.

All other things being equal, higher transmission power corresponds to greater signal range. One approach to maximizing transmit output power involves the use of DFT-based beamforming, where "DFT" denotes Discrete Fourier Transform processing. As a general proposition, DFT-based beamforming involves the transmission of as many beams as there are antenna elements. Consequently, there may be many cases where a controlling standard or other imposed restriction would, absent the teachings herein, limit the maximum number of beams to less than the number that would be used with DFT-based beamforming.

However, the methods and apparatus disclosed herein provide for the transmission of an expanded number of beams 22 within any given defined time interval, thus allowing for the use of DFT-based beamforming under circumstances where it would not otherwise be permitted or feasible. Other example and nonlimiting advantages include the ability to transmit more beams 22 and thereby increase the angular coverage using two or more sets 54 of relatively wide beams 22, or increase the signal range using 2 or more sets 54 of relatively narrow beams 22. Refer to FIGS. 5 and 6 for example illustrations of these respective cases.

While the above discussion emphasizes the advantageous use of frequency division multiplexing to expand the number of beams 22 transmitted within a given time interval, the contemplated scheme also involves time multiplexing in one or more embodiments. That is, with respect to each set 54 of beams 22, the transmission scheme may involve transmitting one beam 22 at a time. Example details for such spaced apart transmissions within the defined time interval are most easily seen in the example of FIG. 7. In addition to the multiplexing aspects of the contemplated transmission scheme, it will be appreciated that the network node 20 may include specific information in the synchronization information transmitted in respective beams 22. For example, the network node 20 may transmit a different synchronization sequence in each beam 22, at least within each set 54 of beams 22.

Additionally, or alternatively, the network node 20 may transmit different identification information within each beam 22, or at least across the respective sets 54 of beams 22. For example, the network node 20 may use a different identifier, e.g. a different cell identifier, for each set 54 of beams 22. With that arrangement, the identification information conveyed in the synchronization information transmitted in a given beam 22 depends on which set 54 contains the beam 22.

Figure 10:
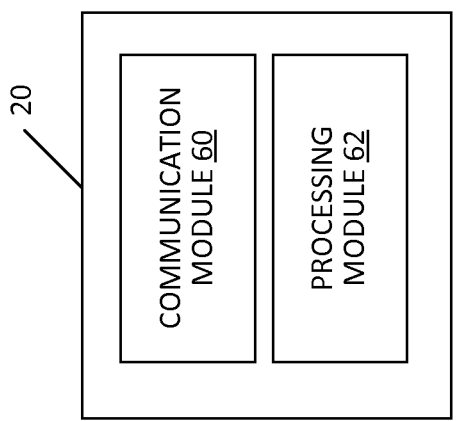
FIG. 10 is a block diagram of one embodiment of processing or functional modules implemented in a network node.

Further, it will be appreciated that the implementation details described above may offer certain advantages and stand as practical examples—see FIGS. 2 and 3 for example—but they are not limiting. FIG. 10 illustrates another implementation example for the network node 20 in which the network node 20 comprises one or more physical or functional modules. In the illustrated example, the network node 20 includes a communication module 60 and an associated processing module 62. The communication module 60 does not necessarily include the communication circuitry of the communication interface 30 introduced in FIG. 2 for example, and instead may correspond to the processing circuitry or functions associated with receiving and transmitting signals or messages used by the processing module 62.

In an example embodiment, the processing module 62 is configured to control the transmission of synchronization information in a plurality of beam directions within a defined time interval, according to a frequency division multiplexing scheme. According to the frequency division multiplexing scheme, for each transmission of synchronization information in a directional beam 22 at a first transmission frequency, there are one or more further, simultaneous transmissions of synchronization information in one or more further directional beams 22 at respective further transmission frequencies.

In another example embodiment, a computer readable medium, e.g., storage 38, stores a computer program 40 comprising program instructions that, when executed by the processing circuitry 36 of a network node 20 configured for operation in a wireless communication network 10, configures the network node 20 to control the transmission of synchronization information from a directional antenna 44 in a plurality of beam directions within a defined time interval, according to a frequency division multiplexing scheme. According to the frequency division multiplexing scheme, for each transmission of synchronization information in a directional beam 22 at a first transmission frequency, there are one or more further transmissions of synchronization information in one or more further directional beams 22 at respective further transmission frequencies.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation at a network node in a wireless communication network, the method comprising:
    mapping Synchronization Signal Blocks (SSBs) to directional beams in two or more sets of directional beams; and
    transmitting the two or more sets of directional beams according to a frequency division multiplexing scheme in which each set of directional beams is transmitted in a different frequency range, with one or more directional beams from each of the two or more sets of directional beams being transmitted at each transmission time in a succession of transmission times within a defined time interval.

2. The method of claim 1, wherein, according to the frequency division multiplexing scheme, the network node transmits, at each transmission time, the respective directional beams in the two or more sets of directional beams to which a same one of the SSBs is mapped.

3. The method of claim 2, wherein the transmission times are different subframes in a transmission frame.

4. The method of claim 3, wherein each set of directional beams is transmitted at a different operating frequency, the different operating frequencies being in respective ones of the different frequency ranges and used by the network node for communicating with wireless devices.

5. The method of claim 3, wherein respective directional beams within a same one of the two or more sets of directional beams carry unique identifiers or sequences, for beam identification by a receiving wireless device.

6. The method of claim 1, further comprising receiving signaling from a wireless device corresponding to synchronization information received by the wireless device receiving one of the SSBs via transmission by the network node of a corresponding one of the directional beams, and identifying the corresponding directional beam based on the return signaling indicating or otherwise depending on the frequency of the corresponding directional beam and further indicating or depending on an identity or synchronization signal sequence that was transmitted in the corresponding directional beam.

7. A network node configured for operation in a wireless communication network, the network node comprising:
    communication circuitry configured to interface the network node to a directional antenna, or to interface the network node to a further network node configured for transmitting from the directional antenna; and processing circuitry configured to map Synchronization Signal Blocks (SSBs) from a set of SSBs to directional beams in two or more sets of directional beams, and, via the communication circuitry, transmit the two or more sets of directional beams according to a frequency division multiplexing scheme in which each set of directional beams is transmitted in a different frequency range, with one or more directional beams from each of the two or more sets of directional beam being transmitted at each transmission time in a succession of transmission times within a defined time interval.

8. The network node of claim 7, wherein, according to the frequency division multiplexing scheme, the network node transmits, at each transmission time, the respective directional beams in the two or more sets of directional beams to which a same one of the SSBs is mapped.

9. The network node of claim 8, wherein the transmission times are different subframes in a transmission frame.

10. The network node of claim 9, wherein each set of directional beams is transmitted at a different operating frequency, the different operating frequencies being in respective ones of the different frequency ranges and used by the network node for communicating with wireless devices.

11. The network node of claim 9, wherein the respective directional beams within a same one of the two or more sets of directional beams carry a unique identifier or sequence, for beam identification by a receiving wireless device.

12. The network node of claim 7, wherein the processing circuitry is configured to receive signaling from a wireless device corresponding to the wireless device receiving one of the SSBs via transmission by the network node of a corresponding one of the directional beams, and identifying the corresponding directional beam based on the return signaling indicating or otherwise depending on the frequency of the corresponding directional beam and further indicating or depending on an identity or synchronization signal sequence that was transmitted in the corresponding directional beam.

* * * * *